United States Patent [19]

Lawler et al.

[11] Patent Number: 4,998,370

[45] Date of Patent: Mar. 12, 1991

[54] ARTIFICIAL AQUATIC BAIT ARTICLE AND METHOD OF MANUFACTURE

[76] Inventors: Adrian Lawler, 2364 Davidson Rd.; Peter Schwark, 288 McCool St., both of Ocean Springs, Miss. 39564; Joe Moore, 3 Legett Cir., Gulfport, Miss. 39503

[21] Appl. No.: 372,428

[22] Filed: Jun. 23, 1989

[51] Int. Cl.⁵ .............................................. A01K 85/00
[52] U.S. Cl. ........................................ 43/42.06; 43/42
[58] Field of Search ............... 426/1; 43/42.53, 42.24, 43/42, 4, 4.5, 42.06

[56] References Cited

U.S. PATENT DOCUMENTS 4,501,083  2/1985  Ong .......................................... 43/42
4,589,223  5/1986  Hastings .............................. 43/42.24

FOREIGN PATENT DOCUMENTS 397907  3/1909  France ...................................... 43/42
48805   5/1988  France ...................................... 43/42
48807   7/1988  Japan ........................................ 43/42
8103    of 1885 United Kingdom .................... 43/42
784362  9/1955  United Kingdom .................... 43/42

Primary Examiner—Richard K. Seidel
Attorney, Agent, or Firm—Pravel, Gambrell, Hewitt, Kimball & Krieger

[57] ABSTRACT

An artificial aquatic bait article and method of manufacture for attracting crabs, fish, lobster, crayfish, and the like, comprising any shaped pellet-like article having a paraffin base as a carrier. A fish oil is carried by any shaped or sized pellet-like article by melting the paraffin and mixing the fish oil with the melted paraffin, allowing the mixture to cool in the desired molded shape.

7 Claims, 1 Drawing Sheet

ARTIFICIAL AQUATIC BAIT ARTICLE AND METHOD OF MANUFACTURE

BACKGROUND OF THE INVENTION

1. Field of the Invention

The present invention relates aquatic bait for use in fishing and/or trapping of aquatic animals such as fishes, turtles, lobsters, crayfish, crabs and the like. The present invention relates more particularly to an improved bait article that includes a wax-like carrier with a fish oil thoroughly mixed therewith and during the addition of heat sufficient to melt the wax carrier so that upon cooling, a moldable fish bait article can be formed of any desired shape or size.

2. General Background

Fishermen use a variety of baits for the purpose of catching fish with a trap or a rod and reel and/or for the purpose of attracting fish close to a boat or pier or other structure, wherein the bait is lowered into the water, possibly several feet below the water surface on a line. The use of a bag or sock containing such a bait product at the end of a line is often referred to as "chum". Crustacea (crawfish, crabs, turtles and lobsters) are normally trapped using a wire mesh trap with a bait or other attractant inside. The traps are periodically harvested.

In the prior art, a "chum" has been used in several forms. One form involves simply the throwing of small fragments of cut fish onto the water surface and letting these fragments sink around the boat. Another version involves the use of a perforated container or can filled with chopped fish which is then lowered into the water, for example, 5-10 feet below the water's surface. This can is sometimes frozen with the fish parts therein so that as it thaws, the "chum" material floats out into the surrounding water. The can is typically perforated with a number of holes allowing water flow to penetrate the can and carry away small bits of "chum" which can be in the form of bits of fish, or other food parts which may attract game fish to the boat. Sometimes the "chum" is in the form of material that attracts small minnows, which in turn attract larger fish.

Fishermen also use several types of artificial baits, lures, and bait products for the purpose of catching fish with a hook. These lures can be in the form of a collapsible container having a hook protruding therefrom wherein the container can be opened and the bait product added to the inside of the container. In some forms, the bait is simply attached to the hook in the same manner as live bait is attached. Sometimes a combination of an artificial bait and a food product or the like is used such as a minnow-shaped artificial lure which is threaded upon a hook or jig and then the food product is added to the lure. Sometimes the food product or like composition is in the form of a spray which is simply dispensed to the external surface of the artificial lure. The spray is sometimes of a synthetic chemical composition.

One of the problems with a "chum" is that it is a messy product to handle. The "chum" is in the form of chopped up bits of fish which generate oil and debris on the user's hands and on the floor of the boat as it is thawed and handled. Further, if the current is strong, the "chum" is quickly carried away and must be replaced in a short period of time. Also, chopped fish "chum" tends to feed fish that are attracted, and make it less likely that they be caught.

Another problem is that if the "chum" is frozen and if the current is not substantially strong, the "chum" may not dispense quickly enough to attract fish. Still another problem with "chum" is that if the water temperature is not sufficiently warm, the "chum" may not melt at all if it is supplied in an initially frozen condition.

Another problem with dead bait is storage of sufficient amounts to bait traps.

Another problem with dead bait is time and labor and gas lost trying to get bait for traps. (Solved storage problems, gas and labor and time losses.)

Another problem with frozen chum products is that of shipping. A fish attractant or "chum" is typically not a product that lends itself to shipping over long distances because of the problems of refrigeration associated with such products.

Because of the need for underwater submersion, a "chum" must not mechanically break up upon exposure to water.

Thus, there is a long felt need in the industry for an easy to manufacture, simple to package, and easily used product which attracts fish and other aquatic animals in both cold and in warm water situations, which does not require freezing, which can be handled easily and with minimum loss of product on the user's hands and on the floor of the boat or pier, etc.

It is thus an object of the present invention to provide a fish attracting article in the form of a "chum" or bait which can be maintained for long periods of time without the need for frozen or refrigerated temperatures.

It is another object of the present invention to provide a fish attracting article which can be manufactured easily and economically and in large quantities, stored easily, and shipped easily.

It is another object of the present invention to provide a product for attracting a wide variety of aquatic life forms including both fish and shellfish (such as crayfish, crabs, lobster and the like).

It is another object of the present invention to provide a fish bait/chum product/trap bait which lasts for long periods of time even when submerged under water.

It is another object of the present invention to provide an artificial aquatic bait article which can be used interchangeably within traps, hooks, or as part of an artificial lure.

It is another object of the present invention to provide an artificial aquatic bait article and its method of manufacture which allows high volumes of product to be manufactured at extremely low cost and which can be molded into a variety of shapes for various uses including in traps, on hooks, or as an artificial lure.

SUMMARY OF THE PRESENT INVENTION

The present invention solves the prior art problems and shortcomings in a simple straightforward and effective manner. The present invention thus provides an aquatic bait article for attracting fish, shellfish, including lobster, crayfish and crabs and the like. The article includes a body having a paraffin base which defines a carrier and a fish oil product carried by the article body, the fish oil all being formed with the article body by melting the paraffin and mixing the fish oil with the melted paraffin, allowing the mixture to cool into any desired molded shape.

In the preferred embodiment, the paraffin base is a petroleum wax.

In the preferred embodiment, the fish oil is a menhaden fish oil.

In the other embodiments, the oil can be an anise oil or an animal oil.

In the preferred embodiment, the ratio by volumes of the wax base to the oil is a ratio of between fifty to one (50:1) and one to one (1:1), the preferred ratio being that of a wax base to the oil of two to one (2:1).

The present invention also provides a method of forming a fish bait article for use in aquatic environment to attract fish, crabs, lobster, crayfish and the like comprising the steps of initially forming a liquid paraffin base; (a) by melting a volume of paraffin to a temperature above its melting point; and b) mixing a volume of fish oil with the liquid melted paraffin base and thereafter allowing the oil and paraffin to solidify into a desired molded shape, at a temperature sufficiently cooled for such solidification.

In the preferred method, the oil is a menhaden fish oil.

In the preferred method, in step "b", the mixture is heated and stirred for at least one minute.

In the preferred method, the paraffin is melted to a temperature of between 110° F. and 160° F.

In the preferred method, the paraffin is a petroleum wax.

In the preferred method, the molded shape forms a pellet-like article. (pie-like article)=Normal shape of product.

The present invention thus provides a method of fishing which comprises the steps of forming a bait product by initially melting a volume of paraffin base to liquid form and mixing fish oil with the melted paraffin, allowing the mixture to cool, and then molding the cooling mixture to the shape of a fishing lure sized article capable of being used on/adjacent a fishing hook and using the article and hook assembly during fishing. In one method, the article is in the form of a pellet carried by separate artificial fishing lure.

In another embodiment of the method, the article is a lure shaped article that can be threaded on a fishing hook, being carried therewith.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

FIGS. 1-7 illustrate the preferred embodiment of the apparatus of the present invention designated in FIGS. 1-7 generally by the numerals 10A-10F respectively illustrating the various embodiments.

Figure 1:
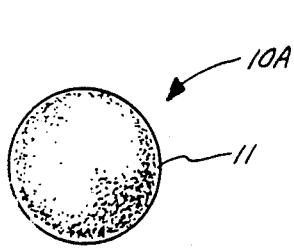
FIG. 1 is a perspective view of the bait article of the present invention in the form of a sphere.
Figure 2:
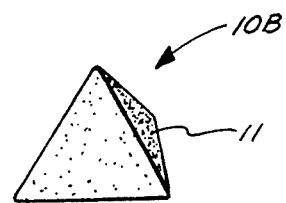
FIG. 2 is a perspective view of the bait article of the present invention in the form of a triangular prism.
Figure 3:
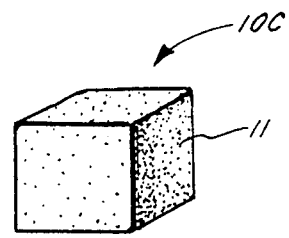
FIG. 3 is a perspective view of the bait article of the present invention in the form of a cube.
Figure 4:
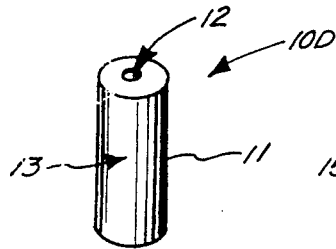
FIG. 4 is a perspective view of the bait article of the present invention in the form of a sliding sleeve for use on a fishing line or in a lobster trap.

In FIG. 1, there can be seen a molded article body 11 in the shape of a sphere designated by the numeral 10A. FIGS. 1-4 thus illustrate various shapes that could be formed using the article of the present invention including a triangular prism 10B (FIG. 2), sphere 10C (FIG. 3), cylinder 10D (FIG. 4) having an outer cylindrical surface 13 for the cylinder body 11 with an internal cylindrical annular bore 12. Thus the article 10B could be threaded upon a line such as a chumline or upon a fishing line. Other shapes could be a "pie" shape as cut from a flat circular disk, or a rectangular bar shape as examples.

Figure 5:
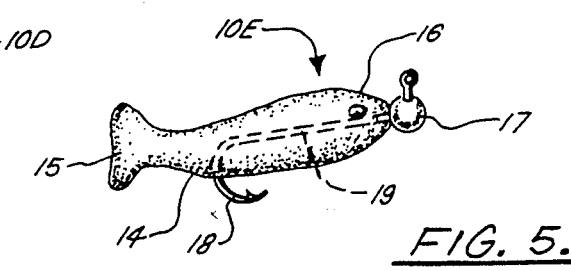
FIG. 5 is a perspective view of the preferred embodiment of the bait article of the present invention in the form of a fish shaped article, adapted to be threaded upon a hook during fishing with hook and line.

In the embodiment of FIG. 5 designated by the numeral 10E, the article 14 is shaped in the form of a lure such as a minnow having a tail 15 and a head 16 portion and wherein the article 14 can be threaded upon a commercially available hook and jig assembly wherein the jig 17 is in the form of a weighted lead end portion and the hook 18 is threaded through the minnow as indicated by phantom lines 19.

Figure 6:
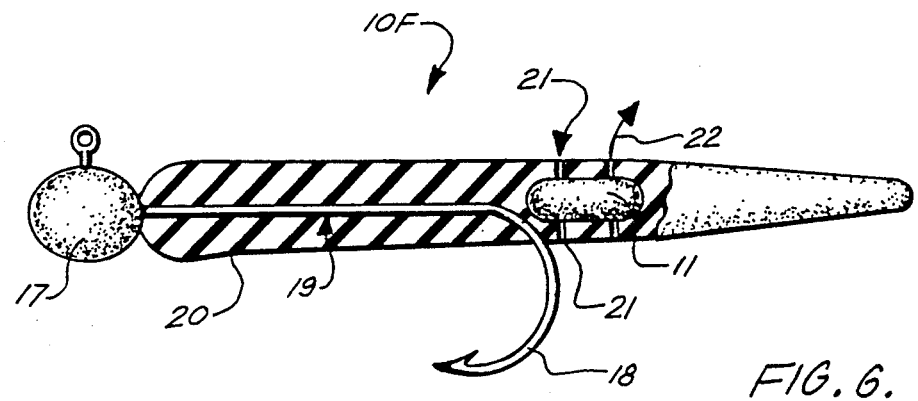
FIG. 6 is a sectional elevational view of the preferred embodiment of the apparatus of the present invention in the form of an artificial lure carrying a pellet which embodies the article of the present invention.
Figure 7:
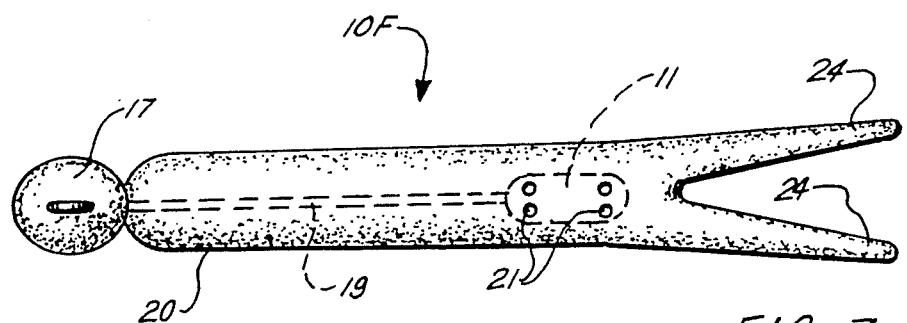
FIG. 7 is a top view of the fishing article of FIG. 6.

In the embodiment of FIGS. 6 and 7, the jig 17 carries hook 18 which protrudes through an artificial lure 20 following a hook path 19. The lure 20 includes a recess occupied by pellet-like body 11 which is the molded article. A plurality of ports 21 allow fluid communication between the pellet-like article body 11 and the exterior thereof so that oil dispensed from the article 11 can flow externally of the lure 20 via ports 21 as shown by the arrow 22 in FIG. 6.

The lure for example can be in the form of a minnow or a flexible forktail minnow like structure such as is shown in FIG. 6 and 7, having a bifurcated tail 24.

The article of the present invention thus is in the form of an aquatic bait article for attracting fish in several forms. The article body 11 in each form has a paraffin base as a carrier. A fish oil is carried by the body 11, the fish oil being formed with the body 11 by melting the paraffin carrier and mixing the fish oil with the melted paraffin, allowing the mixture to cool in a desired molded shape such as one or more of the shapes illustrated in FIGS. 1-5 or in the form of the pellet as shown in FIGS. 6 and 7.

The paraffin is preferably a petroleum wax while the oil is preferably a menhaden oil which is commercially available such as supplied under the trade names Zapata-Haynie or Ampro. Other types of suitable oil additives would include anise oil, other types of fish oils and/or animal oils.

The preferable formula for mixing the oil to the wax includes preferably one part of oil to two parts of wax such as for example eight ounces of menhaden oil to sixteen ounces of paraffin wax. However, a concentration range of between one part by volume of oil to fifty parts by volume of wax (1:50) up through a one to one (1:1) ratio has been found to be acceptable.

During manufacturing, the paraffin carrier is preferably melted to a melting temperature of for example 110°-160° F. in a container. When the paraffin is melted fully, the menhaden oil is added and stirred thoroughly, continuing to heat and stir for approximately 1-4 minutes. The mixture of oil and the paraffin is then poured into a desired mold of desired size and shape and allowed to cool in order to solidify. The article when removed from the mold can be stored in unrefrigerated temperatures, but preferably should be maintained in a relatively cool environment of for example 75° F. or less.

In the preferred method, the paraffin can be melted to its melting point of between 110°-160° F. and can be elevated to higher temperatures of for example 250°-325° F. prior to the addition of the fish or animal oil.

The article formed by the method of the present invention can be used as a fish attractant, or as a shellfish attractant such as for use with crayfish, lobster, crabs. The article of the present invention has been successful in attracting fish and shellfish when used in traps, as a "chum" or as a bait on a hook.

The term paraffin as used herein is a broad term, used to describe any wax-like substance, such as the high boiling residue obtained from petroleum crude. This product is recovered out on a cold drum and is purified by crystalization from methylethylketone. Paraffin wax is a mixture of 26-30 carbon alkane hydrocarbons and it melts at 52°-57° C. Thus, the paraffin as used herein is a substance that is primarily produced from the de-waxing of lubricating oil fractions of petroleum. It may be either of a crystalline or micro-crystalline type. The crystalline wax is produced from distillate lubricating fractions, whereas the micro-crystalline wax is obtained from the residual lubricating fractions of the crude oil. Melting point range for refined crystalline waxes is 120°-150° F. while the petroleum or micro-crystalline waxes have melting points in the range of 150°-175° F. During purification of crude wax, the higher melting point waxes are removed. The cuts or fractions are then blended to provide the desired range of melting point which varies generally from 110° F. to approximately 160° F.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An aquatic bait article for long term underwater use in attracting crabs, fishes lobster, crayfish, turtles and the like by long term release of fish oil comprising:
   (a) an article body having a paraffin base as a carrier and with a melting point of about 110°-160 ° F.;
   (b) a fish oil distributed throughout and carried by the article body;
   (c) the fish oil formed with the article body by heating the paraffin to a temperature above its melting point and mixing the fish oil with the melted paraffin, allowing the mixture to cool in a desired molded shape.

2. The article of claim 1 wherein the paraffin base is a petroleum wax.

3. The article of claim 1 wherein the fish oil is menhaden fish oil.

4. The article of claim 1 wherein the oil is anise oil.

5. The article of claim 1 wherein the oil is an animal oil.

6. The article of claim 1 wherein the ratio by volume of the wax base to oil is a ratio of between 50:1 and 1:1.

7. The article of claim 1 wherein the ratio by volume of wax base to oil is on the order of 2:1.

* * * * *